United States Patent [19]

Hansen

[11] 3,747,980
[45] July 24, 1973

[54] VIBRATOR FOR DUMP TRUCKS
[76] Inventor: Harold H. Hansen, 401 Monroe Pl., Minnetonka, Minn. 55343
[22] Filed: Dec. 10, 1971
[21] Appl. No.: 206,744

[52] U.S. Cl. .................................. 298/1 V, 259/72
[51] Int. Cl. .............................................. B60p 1/58
[58] Field of Search ...................... 298/1 V; 74/87; 259/DIG. 42, 72

[56] References Cited
UNITED STATES PATENTS
2,624,479   1/1953   Musschoot ......................... 298/1 V
3,343,876   9/1967   Rapp ................................. 298/1 V
3,438,677   4/1969   Redpath ............................ 298/1 V Primary Examiner—Richard J. Johnson
Assistant Examiner—Reinhard Eisenzoff
Attorney—G. A. Ellestad

[57] ABSTRACT

A vibrator for the box of a dump truck is formed with an elongated square metal tube within which are welded three spaced apertured plates with the first plate at one end of the tube, the second plate adjacent to the other end of the tube and the third plate between the other two and nearer to the first plate. An apertured disk is bolted to the second plate and aligned bearings are secured, respectively, to the third plate and the disk for rotatably supporting a shaft. Carried by the shaft between the bearings is a weight which is eccentrically mounted with respect to the axis of the shaft. Bolted to the outer face of the first plate is an electric motor with its shaft projecting through the aperture in the first plate and connected to the first named shaft with a flexible coupling whereby actuation of the motor will vibrate the box of the dump truck. The top side of the tube is provided with an opening for servicing purposes.

1 Claim, 7 Drawing Figures

Patented July 24, 1973
3,747,980
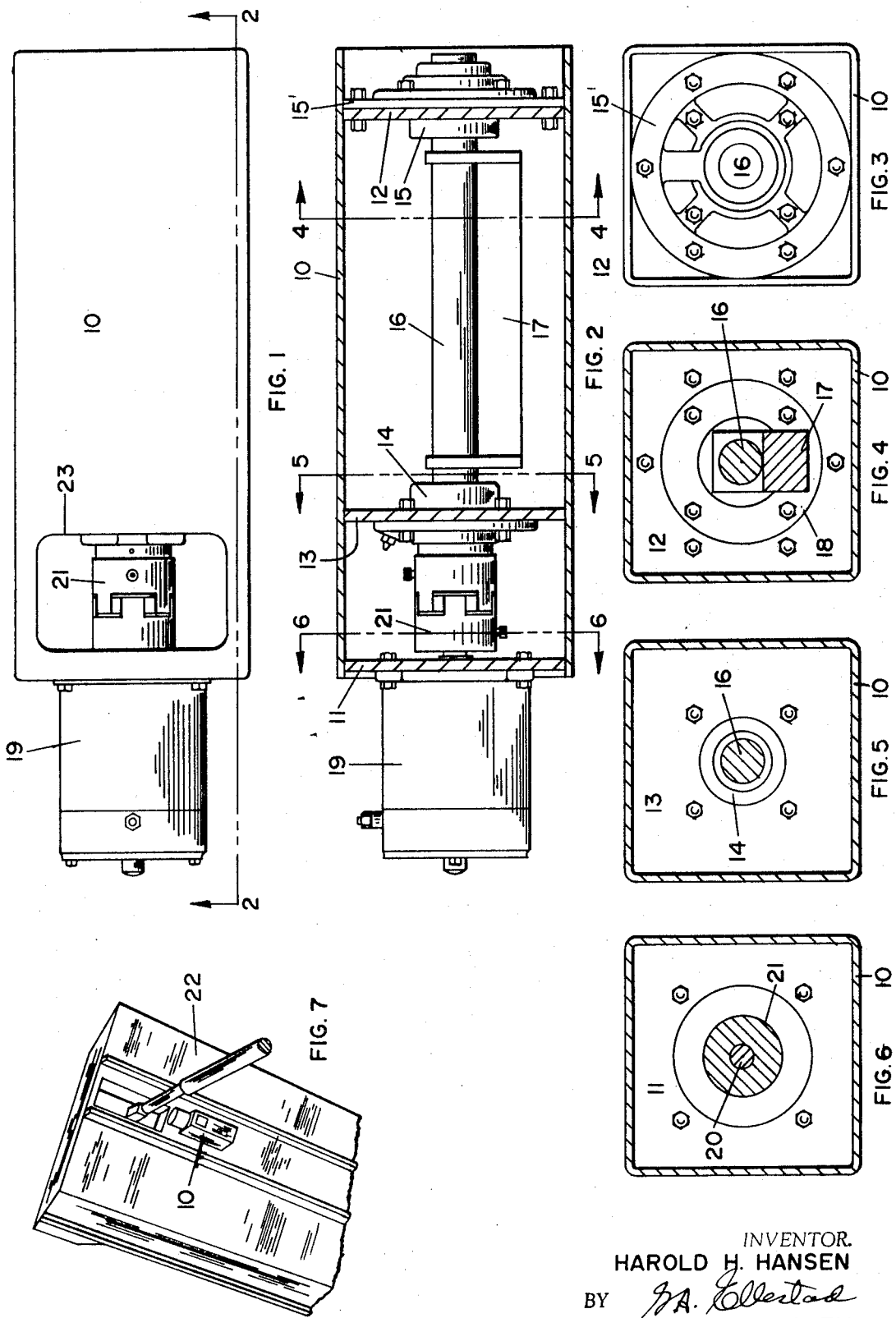
INVENTOR.
HAROLD H. HANSEN
BY
ATTORNEY

VIBRATOR FOR DUMP TRUCKS

BACKGROUND OF THE INVENTION

This invention relates to dump trucks and more particularly it has reference to means for vibrating or shaking the box of the truck to facilitate removal of material from the box when it is inclined for the dumping operation. Materials such as sand or the like often have a tendency to adhere to the sides or bottom of the inclined box making it necessary to dislodge the material with long poles or rakes. Vibrators of the prior art are generally relatively complicated in structure, expensive to manufacture or incapable of standing hard usage.

SUMMARY OF THE INVENTION

Objects of the invention are to provide a vibrator of the type described which will be relatively simple in structure, economical to manufacture and capable of withstanding relatively long terms of hard usage.

According to the invention, there is provided an elongated rectangular metal tube within which are three spaced metal plates which have their edges welded to the respectively adjacent sides of the tube. The first plate is located at one end of the tube, the second plate adjacent to the other end of the tube and the third plate between the other two and closer to the first plate. Each of the plates has a central aperture. Bolted to the second plate is a disk which has a central aperture. Bearing means are bolted to the disk and third plate for rotatably supporting a shaft which carries an elongated weight mounted eccentrically to the axis of the shaft. Mounted externally of the tube and bolted to the first plate is an electric motor having its shaft in alignment with the first named shaft and connected thereto by a flexible coupling. The motor is energized by the battery of the truck and controlled by a switch in the cab of the truck.

BRIEF DESCRIPTION OF THE DRAWINGS

FIG. 1 is a top plan view of the vibrator embodying the invention.

FIG. 2 is a vertical sectional view taken on line 2—2 of FIG. 1 looking in direction of the arrows.

FIG. 3 is an elevational view as seen from the right hand end of FIG. 1.

FIG. 4 is a sectional view on line 4—4 of FIG. 2 looking in the direction of the arrows.

FIG. 5 is a sectional view on line 5—5 of FIG. 2 looking in the direction of the arrows.

FIG. 6 is a sectional view taken on line 6—6 and looking in the direction of the arrows.

FIG. 7 is a fragmentary perspective view showing the vibrator of the invention mounted on the under side of a truck box.

DESCRIPTION OF PREFERRED EMBODIMENTS

A preferred embodiment of the invention is shown in the drawings wherein 10 indicates an elongated rectangular steel tube which is preferably square and is a standard item which is available on the market. Mounted within tube 10 are the spaced metal plates 11, 12, and 13 each having their edges welded to the respectively adjacent sides of the tube. The first plate 11 is located at the left hand end of tube 10 as viewed in FIG. 1, the second plate 12 adjacent to and slightly inwardly from the other or right hand end and the third plate 13 is located between the other two and closer to the first plate, as shown in FIG. 2. Each of the plates has a centrally disposed aperture and all of the apertures are in alignment.

The bearing unit 14 is bolted to the plate 13 and the bearing unit 15 is bolted to the disk 15' which is bolted to the plate 12. Rotatably supported in the bearing units is the shaft 16 and secured thereto between the bearings is an elongated weight 17 which is eccentrically mounted with respect to the axis of the shaft. For assembling and servicing purposes, the aperture 18 in the plate 12 must be large enough to permit the insertion or withdrawal of shaft 16 together with its attached weight 17. In order to accomplish this while still utilizing a commercially available bearing unit, the bearing unit 15 is bolted to the disk 15' which is detachably secured to the plate 12 by bolts.

Secured by bolts to the outer face of plate 11 and externally of the tube is the electric motor 19 having its shaft 20 extending through the aperture in plate 11 and in alignment with the shaft 16. The adjacent ends of the shafts 16 and 20 are operatively connected by suitable means such as the flexible coupling 21.

In operation, the vibrator is attached, as by welding, to the under side of the box 22 of a dump truck, as shown in FIG. 7. The motor is energized by the battery of the truck with the operation controlled by a switch in the cab of the truck. Rotation of the shaft 16 and its eccentrically mounted weight 17 will produce vibration of the inclined box and shake loose any material adhering thereto. The vibrator can be made at a minimum cost since it utilizes commercially available materials and requires for its manufacture relatively few and simple mechanical operations. Because of its rugged construction, the vibrator can withstand the mechanical stresses produced so that servicing and repairs are reduced to a minimum. The top side of the tube 10 is provided with an opening 23 between the first and third plates for servicing and assembling purposes.

I claim:

1. The combination of a dump truck having an inclinable box and means mounted on the under side of the box for vibrating it to facilitate removal of material therefrom wherein the improvement is a vibrator comprising an elongated rectangular tube, three spaced rectangular plates fitted within the tube with all edges of the plates welded to the respectively adjacent sides of the tube, each of the plates having a central aperture, the first plate being located at one end of the tube, the second plate being located adjacent to the other end of the tube, the third plate being located between the other plates and nearer to the first plate, spaced bearing means detachably carried, respectively, by the second and third plates and in alignment with the apertures, a shaft mounted to rotate in the spaced bearing means, a weight extending along the shaft between the bearing means and secured to the shaft in eccentric relation, the aperture in the second plate being large enough to permit insertion of the shaft and attached weight, an apertured disk bolted to the second plate and detachably carrying the adjacent bearing means, an electric motor removably mounted on the first plate externally of the tube and with its shaft extending through the aperture in the first plate in substantial alignment with the first named shaft and means coupling the adjacent ends of the shafts whereby actuation of the motor will rotate the eccentrically mounted weight to produce vibrations of the inclined truck box and facilitate removal of material.

* * * * *